United States Patent [19]
Youn

[11] Patent Number: 5,966,303
[45] Date of Patent: Oct. 12, 1999

[54] POSITION CONTROL SIGNAL GENERATING CIRCUIT

[75] Inventor: Yue-tai Youn, Suwon, Rep. of Korea

[73] Assignee: Samsung Electronics Co., Ltd., Suwon, Rep. of Korea

[21] Appl. No.: 08/799,765

[22] Filed: Feb. 12, 1997

[51] Int. Cl.$^6$ .................................................. G05B 19/00
[52] U.S. Cl. ..................... 364/167.02; 318/560
[58] Field of Search ..................... 388/804, 829, 388/907, 811, 819; 340/825; 318/696, 54, 65, 127, 293, 560, 568.17, 568.11; 364/142, 167.02, 528.37; 702/94, 145; 74/495

[56] References Cited

U.S. PATENT DOCUMENTS

| | | | |
|---|---|---|---|
| 5,089,759 | 2/1992 | Miotke et al. | 318/568.11 |
| 5,687,277 | 11/1997 | Matsuzaki | 388/804 |
| 5,731,672 | 3/1998 | Miyaguchi | 318/293 |

OTHER PUBLICATIONS

Charles M. Roth, Jr. Fundamentals of Logic Design Third Edition 1985 pp. 198,199.

*Primary Examiner*—Melanie A. Kemper
*Attorney, Agent, or Firm*—Burns, Doane, Swecker & Mathis, L.L.P.

[57] ABSTRACT

A position signal generating circuit which is operated by a position controller for generating first and second determining signals, a rotation direction selection signal and an enable signal, the circuit including: a pulse generator for generating a basic pulse; a gate circuit for logic-operating the basic pulse from the pulse generator and the first and second mode determining signals from the position controller to output signals indicating the logic-operated results; and a rotation direction determining unit for combining the signals output from the gate circuit according to the rotation direction selection signal from the position controller to generate a position control signal. A desired position control signal can be generated by using simplified hardware and software without an additional selection switch.

8 Claims, 4 Drawing Sheets

POSITION CONTROL SIGNAL GENERATING CIRCUIT

BACKGROUND OF THE INVENTION

The present invention relates to a circuit for generating a position control signal, and more particularly, to a position control signal generating circuit which is operated by a position controller in a programmable logic controller (PLC), a robot or a computer-aided numerical control (CNC) system, and connected to a motor drive.

A typical position control mode of a system is largely divided into a CW/CCW (clockwise/counterclockwise) signal mode and a pulse/sign signal mode. FIG. 1 is a timing diagram showing the CW/CCW signal mode. As shown in FIG. 1, the L shapes of the CW signal and the CCW signal are the same and an object to be controlled, e.g., a motor is driven to rotate in a forward direction according to the CW signal and not the CCW signal. The motor is rotated in the opposite or reverse direction by the CCW signal. FIG. 2 is a timing diagram showing the pulse/sign signal mode. As shown in FIG. 2, a pulse signal is constantly applied to a motor drive and the directions of rotation of the motor are determined by a sign signal.

A conventional position control signal generating circuit is largely divided into the following two circuits.

One is a circuit which generates either the CW/CCW signal or the pulse/sign signal according to a corresponding driver. Such a circuit is advantageous in that it has a simple structure and control method, but it lacks compatibility for a position controller.

The other is a circuit which concurrently generates the CW/CCW signal and the pulse/sign signal and selects a desired signal using an additional selection switch.

FIG. 3 is a block diagram showing a conventional position control signal generating circuit having an additional selection switch.

Referring to FIG. 3, a position controller 1 including a microprocessor unit (MPU) (not shown) and a peripheral circuit (not shown) controls a pulse generator 2 in order to generate a predetermined pulse signal. The pulse signal output from the pulse generator 2 is converted to the CW/CCW signal and the pulse/sign signal in a CW/CCW circuit 3 and a pulse/sign circuit 4, respectively. Then, a signal for rotation in a forward or reverse direction in the form of a CW/CCW signal is output from a first rotation direction determining unit 5, while a signal for rotation in a forward or reverse direction in the form of a pulse/sign signal is output from a second rotation direction determining unit 6. Next, the output signal of the first or second rotation direction determining unit (5 or 6) is selected by an operator using a selection switch 7 and input to an external drive connector 8. In such a position control signal generating circuit, it is inconvenient for an operator to operate the additional selection switch.

In the meantime, there is a circuit for selecting a desired position control signal using the controller 1 instead of the selection switch 7; however, hardware and software become complicated.

SUMMARY OF THE INVENTION

To solve the above problems, it is an object of the present invention to provide a circuit for generating a desired position control signal having a simplified hardware and software and no additional selection switch.

Accordingly, to achieve the above object, there is provided a position signal generating circuit which is operated by a position controller for generating first and second determining signals, a rotation direction selection signal and an enable signal, the circuit including: a pulse generator for generating a basic pulse; a gate circuit for logic-operating the basic pulse from the pulse generator and the first and second mode determining signals from the position controller to output signals indicating the logic-operated results; and a rotation direction determining unit for combining the signals output from the gate circuit according to the rotation direction selection signal from the position controller to generate a position control signal.

It is preferred in the present invention that the first and second mode determining signals are stored in a predetermined latch circuit, and then input to the gate circuit according to the enable signal output from the position controller, and after being stored in the latch circuit, the rotation direction selection signal is input to the rotation direction determining unit according to the enable signal output from the position controller.

It is also preferred in the present invention that the position control signal is functionally divided into a CW/CCW signal in a forward direction, a CW/CCW signal in a reverse direction, a pulse/sign signal in the forward direction, a pulse/sign signal in the reverse direction and a halt signal in accordance with the signals stored in the latch circuit.

Furthermore, it is preferred in the present invention that the gate circuit includes: a first OR gate to which the basic pulse and the first mode determining signal are input; a second OR gate to which the basic pulse and the second mode determining signal are input; and an AND gate to which signals output from the first and second OR gates are input, and that the signals output from the gate circuit are an output signal of the AND gate, an output signal of the first OR gate, the second mode determining signal and an output signal of the second OR gate.

It is further preferred in the present invention that the rotation direction selection signal is applied to a selection input port of the multiplexer.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
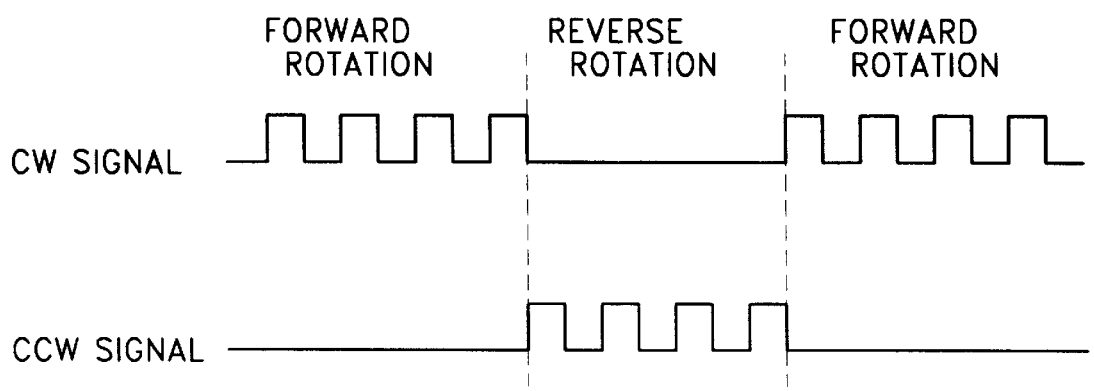
FIG. 1 is a timing diagram showing a CW/CCW signal mode.
Figure 2:
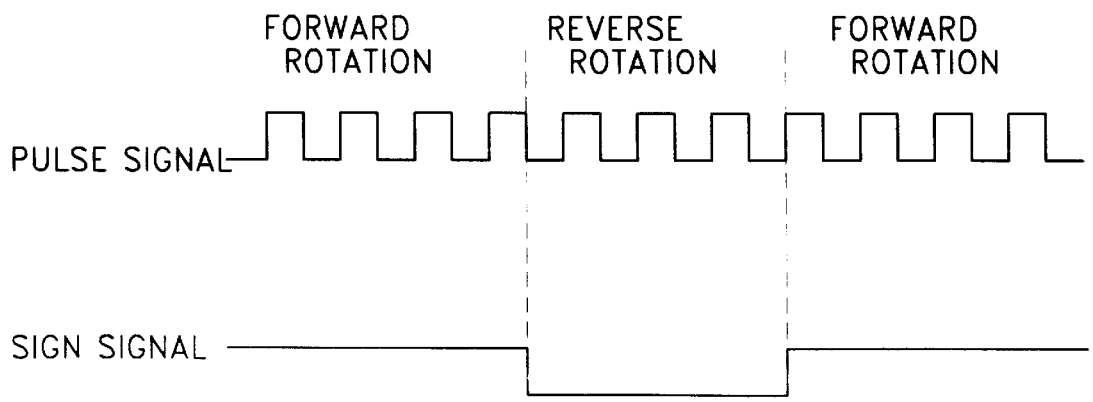
FIG. 2 is a timing diagram showing a pulse/sign signal mode.
Figure 3:
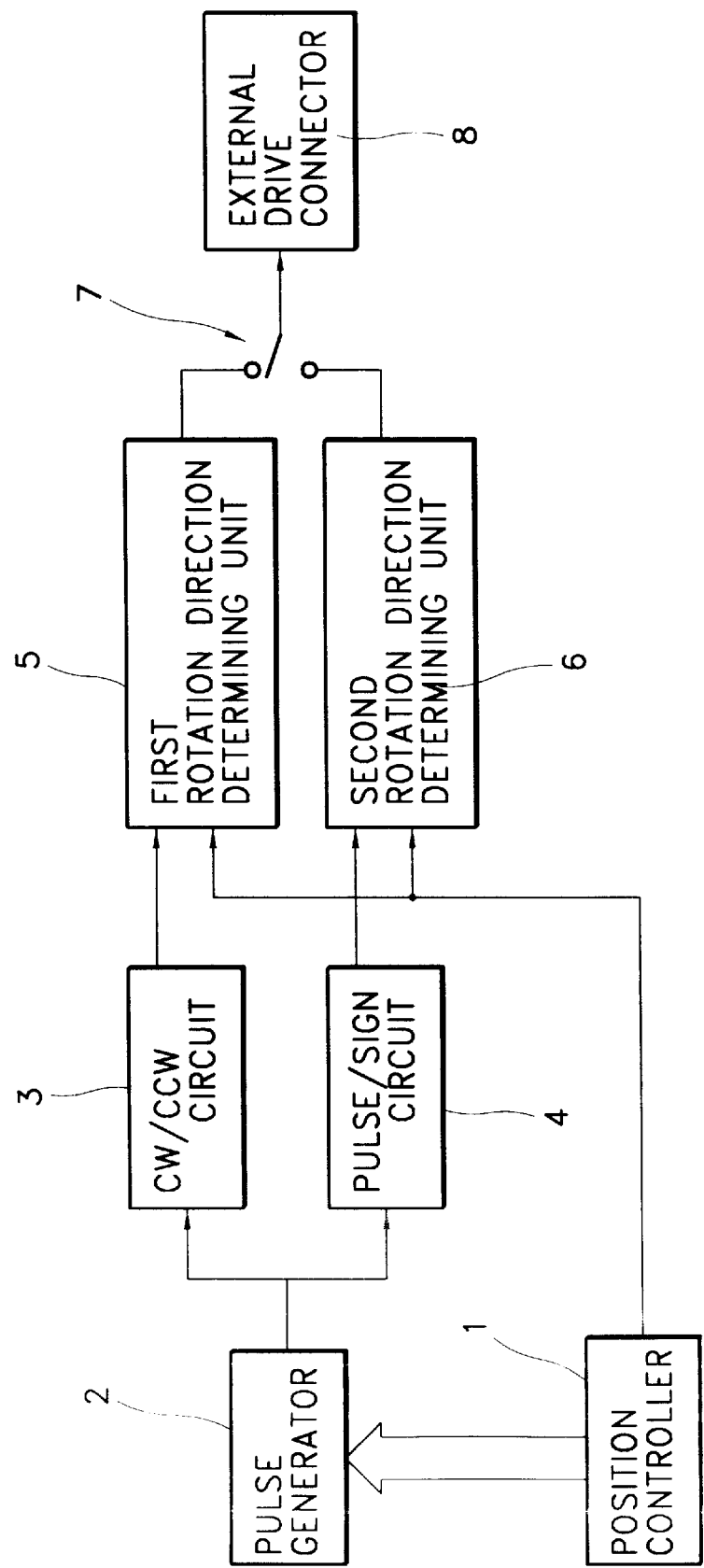
FIG. 3 is a block diagram of a conventional position control signal generating circuit having an additional selection switch.
Figure 4:
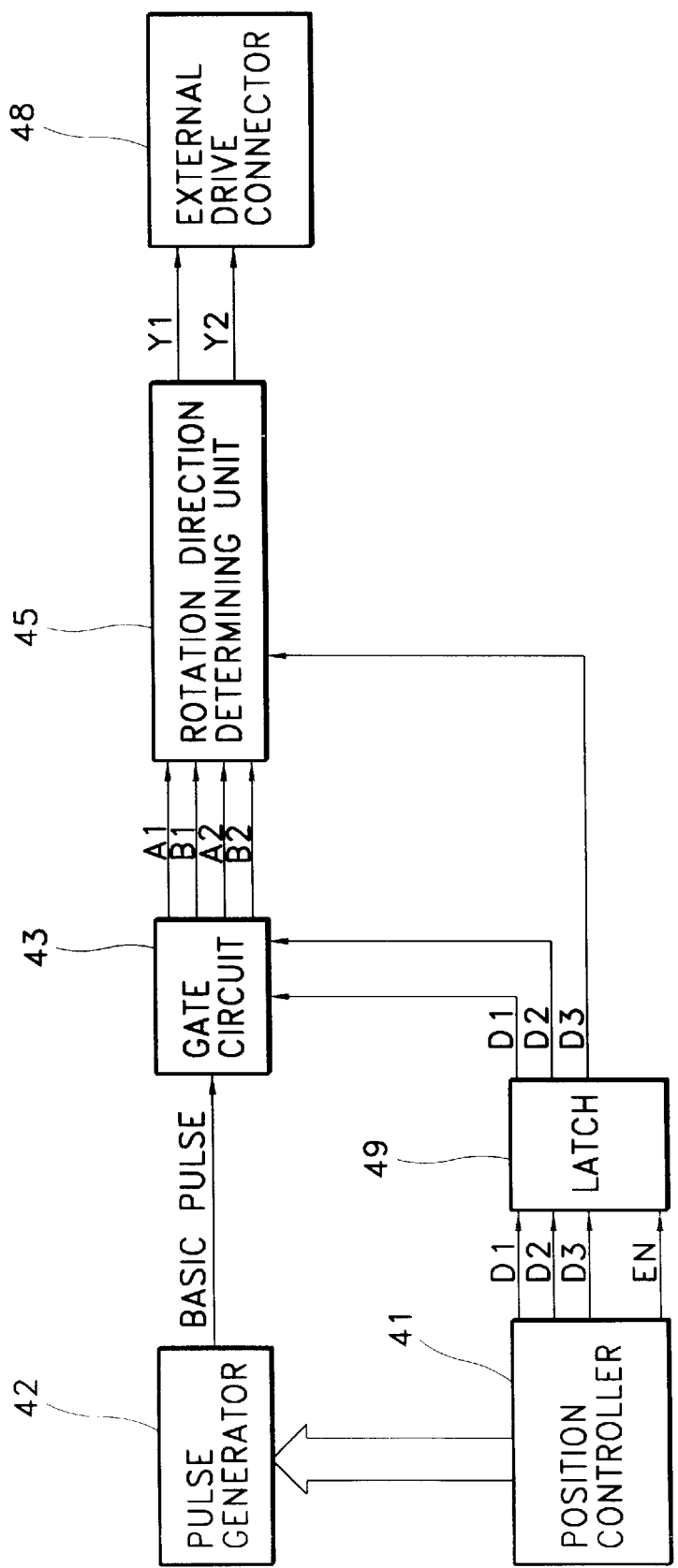
FIG. 4 is a block diagram of a position control signal generating circuit according to the present invention.

Referring to FIG. 4, a position control signal generating circuit according to an embodiment of the present invention will be described.

First, a position controller 41 including a microprocessor unit (MPU) (not shown) and a peripheral circuit (not shown) generates a predetermined basic pulse by controlling a pulse generator 42. A first mode determination signal D1, a second mode determination signal D2 and a rotation direction selection signal D3 output from the position controller 41 are stored in a latch 49. The stored control signals D1–D3 are input to a gate circuit 43 and a rotation direction determining unit according to a latch enable signal EN of the position controller 41. At this time, the first and second mode determination signals D1 and D2 are input to the gate circuit 43 and the rotation direction selection signal D3 is input to the rotation direction determining unit 45.

In the gate circuit 43, the basic pulse and the first and second mode determination signals D1 and D2 are logically operated and signals A1, B1, A2 and B2 corresponding to each logical case are output. The signals A1, B1, A2 and B2 are combined in the rotation direction determining unit 45 according to the rotation direction selection signal D3 and then corresponding position control signals Y1 and Y2 are generated therefrom. For instance, the two position control signals Y1 and Y2 have the following four output forms: a forward rotation CW/CCW signal, a reverse rotation CW/CCW signal, a forward rotation pulse/sign signal and a reverse rotation pulse/sign signal. A signal selected from the signals are applied to an external drive connector 48.

Figure 5:
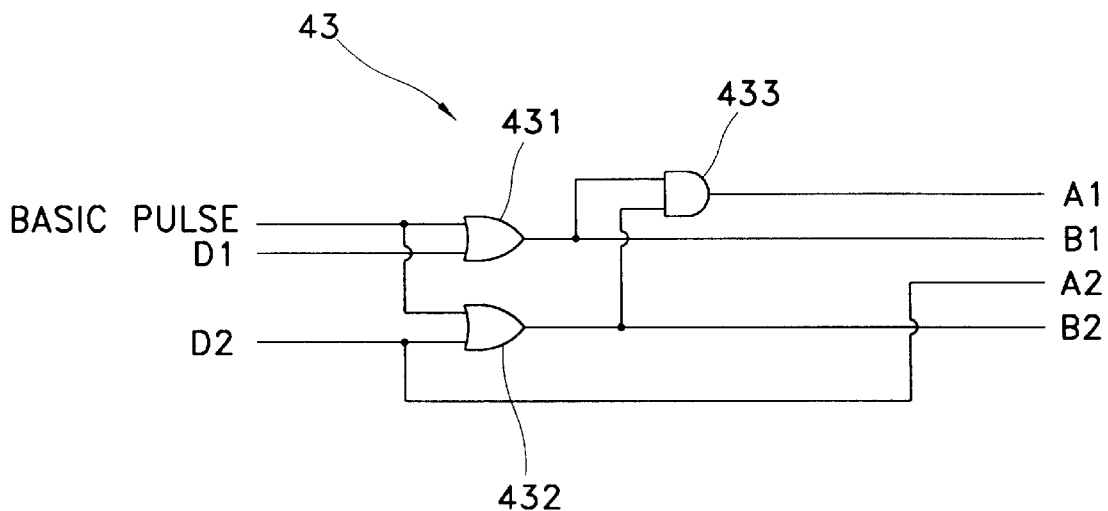
FIG. 5 is a circuit diagram showing a gate circuit of FIG. 4.

FIG. 5 shows the gate circuit 43 of FIG. 4. As shown in FIG. 5, the gate circuit 43 according to the present embodiment two OR gates 431 and 432 and one AND gate 433. Here, the basic pulse generated from the pulse generator (42 of FIG. 4) and the first mode determination signal D1 are input to the first OR gate 431. The basic pulse and the second mode determination signal D2 are input to the second OR gate 432. The output signal of the first OR gate 431 is output as the second signal B1 and that of the second OR gate 432 is output as the fourth signal B2. The second mode determination signal D2 is output directly as the third signal A2. The output signals of the two OR gates 431 and 432 are input to an AND gate 433 and a signal is output therefrom as the first signal A1.

Figure 6:
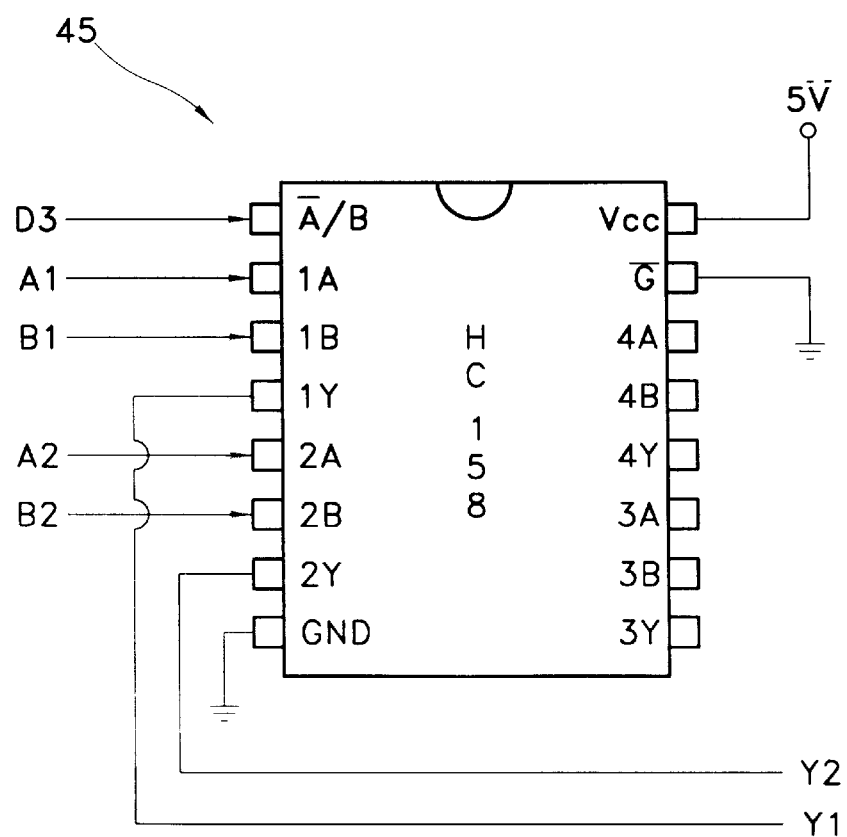
FIG. 6 is a circuit diagram showing a rotation direction determining unit of FIG. 4 in relation to FIG. 5.

FIG. 6 shows the rotation direction determining unit 45 of FIG. 4 with relation to FIG. 5. In the present embodiment, an HC158 multiplexer is employed as the rotation direction determining unit 45. As shown in FIG. 6, the rotation direction selection signal D3 is applied to an $\overline{A}/B$ selection port; the first signal A1 to a data input port 1A; the second signal BE to a data input port 1B; the third signal A2 to a data input port 2A; and the fourth signal B2 to a data input port 2B. Here, signals generated from output ports 1Y and 2Y operate as the two position control signals Y1 and Y2 of FIG. 4.

The functions of the multiplexer employed as the rotation direction determining unit 45 of FIG. 6 is shown in the following Table 1.

TABLE 1

| INPUT | | | | OUTPUT Y |
|---|---|---|---|---|
| | SELECTION | DATA | | |
| STROBE $\overline{G}$ | $\overline{A}/B$ | A | B | |
| H | X | X | X | H |
| L | L | L | X | H |
| L | L | H | X | L |
| L | H | X | L | H |
| L | H | X | H | L |

In Table, H indicates a state of "high", L a state of "low", and X a state of "don't care". As shown in Table, when the strobe input $\overline{G}$ is "high", all the outputs of the HC158 multiplexer become high regardless of other input conditions. Accordingly, as shown in FIG. 6, the strobe input $\overline{G}$ is fixed to a low state. However, under a certain circumstance, the strobe input $\overline{G}$ can be utilized through the position controller (41 of FIG. 4) and the latch (49 of FIG. 4). In the meantime, when the strobe input $\overline{G}$ and the selection input $\overline{A}/B$ are all low, the output Y which is in an inverted state to the data input A is generated. On the contrary, when the strobe input $\overline{G}$ is low and the selection input $\overline{A}/B$ is high, the output Y which is in an inverted state to the data input B is generated.

The following is a function table of FIG. 4 based on FIGS. 5, 6 and 7.

TABLE 2

| BASIC PULSE | D1 | D2 | D3 | Y1 | Y2 | OPERATION MODE |
|---|---|---|---|---|---|---|
| ⎍⎍⎍⎍⎍ | 0 | 0 | 0 | ⎍⎍⎍⎍⎍ | ⎍ | |
| | 0 | 0 | 1 | ⎍⎍⎍⎍⎍ | ⎍⎍⎍⎍⎍ | |
| | 0 | 1 | 0 | ⎍⎍⎍⎍⎍ | ⎍ | CW/CCW Forward Rotation |
| | 0 | 1 | 1 | ⎍⎍⎍⎍⎍ | ⎍ | Pulse/Sign Reverse Rotation |
| | 1 | 0 | 0 | ⎍⎍⎍⎍⎍ | ⎍ | Pulse/Sign Forward Rotation |

TABLE 2-continued

| BASIC PULSE | D1 | D2 | D3 | Y1 | Y2 | OPERATION MODE |
|---|---|---|---|---|---|---|
| | 1 | 0 | 1 | ⁻⌐___ | _⌐⌐⌐⌐⌐_ | CW/CCW Reverse Rotation |
| | 1 | 1 | 0 | ⁻⌐___ | ⁻⌐___ | |
| | 1 | 1 | 1 | ⁻⌐___ | ⁻⌐___ | Halt |

In Table 2, D1 indicates the first mode determining is signal; D2 the second mode determining signal; D3 the rotation direction selection signal; Y1 the first position control signal; and Y2 the second position control signal. Data "0" and "1" indicate a low state and a high state, respectively. As indicated as above, in the state where the basic pulse generated from the pulse generator (42 of FIG. 4) is applied to the gate circuit (43 of FIG. 4), the CW/CCW signal in the forward direction is generated when data D1, D2 and D3 is "010"; the pulse/sign signal in the reverse direction when "011"; the pulse/sign signal in the forward direction when "100"; and the CW/CCW signal in the reverse direction when "101". The corresponding motor halts when the two position control signals Y1 and Y2 are low by rendering the data to be "111".

It is noted that the present invention is not limited to the preferred embodiment described above, and it is apparent that variations and modifications by those skilled in the art can be effected within the spirit and scope of the present invention defined in the appended claims.

As described above, in the position control signal generating circuit according to the present invention, a desired position control signal can be generated by using simplified hardware and software without additional selection switch.

What is claimed is:

1. A position signal generating circuit which is operated by a position controller generating first and second mode determining signals and a rotation direction selection signal, said circuit comprising:
    a pulse generator generating a basic pulse;
    a gate circuit logic-operating the basic pulse from said pulse generator and the first and second mode determining signals from said position controller to output signals indicating the logic-operated results; and
    a rotation direction determining unit combining the signals output from said gate circuit according to the rotation direction selection signal from said position controller to generate a position control signal wherein, in said first mode, said position control signal includes a CW/CCW signal, and, in said second mode, said position control signal includes a pulse/sign signal.

2. A position control signal generating circuit as claimed in claim 1, wherein said position controller generates an enable signal,
    wherein the first and second mode determining signals are stored in a latch circuit, and input to said gate circuit according to the enable signal output from said position controller, and
    wherein the rotation direction selection signal is input to said rotation direction determining unit according to the enable signal output from said position controller.

3. A position control signal generating circuit as claimed in claim 2, wherein the position control signal is transmitted on two signal paths on which are concurrently generated portions of said position control signal.

4. A position control signal generating circuit as claimed in claim 3, wherein the position control signal from said rotation direction determining unit is functionally divided into a CW/CCW signal in a forward direction, a CW/CCW signal in a reverse direction, a pulse/sign signal in the forward direction, a pulse/sign signal in the reverse direction and a halt signal in accordance with the signals stored in said latch circuit.

5. A position control signal generating circuit as claimed in claim 1, wherein said gate circuit comprises:
    a first OR gate to which the basic pulse and the first mode determining signal are input;
    a second OR gate to which the basic pulse and the second mode determining signal are input; and
    an AND gate to which signals output from the first and second OR gates are input.

6. A position control signal generating circuit as claimed in claim 5, wherein the signals output from said gate circuit include an output signal of said AND gate, an output signal of said first OR gate, the second mode determining signal and an output signal of said second OR gate.

7. A position control signal generating circuit as claimed in claim 6, wherein said rotation direction determining unit comprises a multiplexer.

8. A position control signal generating circuit as claimed in claim 7, wherein said rotation direction selection signal is applied to a selection input port of said multiplexer.

* * * * *